US005593485A

United States Patent [19]

Wang

[11] Patent Number: 5,593,485

[45] Date of Patent: Jan. 14, 1997

[54] EXTINGUISHING COMPOSITIONS AND PROCESS FOR PRODUCING THE SAME

[76] Inventor: Chih-Cheng Wang, No. 20, Yang Ming Eight Street, Tao-Yuan City, Taiwan

[21] Appl. No.: 593,053

[22] Filed: Jan. 29, 1996

[51] Int. Cl.[6] ............................ A62D 1/00; C09K 21/04; C09K 21/10

[52] U.S. Cl. .................................... 106/18.13; 106/18.14; 106/18.15; 106/18.16; 106/18.17; 106/18.21; 252/2

[58] Field of Search ............................ 106/18.11, 18.13, 106/18.14, 18.15, 18.16, 18.17, 18.21; 252/2

[56] References Cited

U.S. PATENT DOCUMENTS

| | | | |
|---|---|---|---|
| 2,935,471 | 5/1960 | Aarons et al. | 106/18.13 |
| 3,819,517 | 6/1974 | Cavazos et al. | 106/18.13 |

FOREIGN PATENT DOCUMENTS

| | | | |
|---|---|---|---|
| 49-039298 | 4/1974 | Japan | 106/18.13 |
| 54-141823 | 11/1979 | Japan | 106/18.13 |
| 2001084 | 10/1993 | Russian Federation | 106/18.13 |
| 821968 | 10/1959 | United Kingdom | 106/18.16 |

OTHER PUBLICATIONS

Chemical Abstract No. 68:4017, abstract of German Patent Specification No. 1,245,519 published on Jul. 1967.

*Primary Examiner*—Anthony Green
*Attorney, Agent, or Firm*—Bacon & Thomas

[57] ABSTRACT

A fire proof or extinguishing compositions consisting of diammonium hydrogen phosphate, disodium hydrogen phosphate, dicyandiamide, sodium borate decahydrate and water, is characterized in that it is non-toxic, non-polluting and free of chlorofluorocarbons, and that its extinguishing effect is significantly enchanced as well as it can replace Halon 1211 as extinguishing material for using in portable or automatic extinguishing systematic engineering.

7 Claims, No Drawings

EXTINGUISHING COMPOSITIONS AND PROCESS FOR PRODUCING THE SAME

BACKGROUND OF THE INVENTION

1. Field of the Invention

The invention relates to fire extinguishing compositions and a process for producing the same, wherein said compositions are extinguishing solutions or reagents having environmental protection, fire-inhibition, oxygen-insulation and cooling functions, and can eliminate thoroughly the whole three elements of combustion: combustible materials, temperature and oxygen, so that the object of instant extinguishing can be achieved.

2. Description of the Prior Art

At present, most of commercial dry type extinguishing materials, such as, dry powder, carbon dioxide, and haloalkane, contain toxic substances, such as, sodium cyanocarbonate, potassium cyanocarbonate, or chlorofluorocarbons, which can not only damage the health of the human body, but also pollute the environment; and among which, especially, chlorofluorocarbons, whose substitutes are being searched for in the world in order to lower the damage of chlorofluorocarbons to the ozone layer.

In view of this, for the purpose of overcoming the above-mentioned disadvantages, the inventors of the present application have devoted actively in intensive developments and experiments, and, at last, provide successfully the present fire extinguishing compositions and the process for producing the same, which can get rid of disadvantages of conventional products.

SUMMARY OF THE INVENTION

The object of the invention is to overcome the disadvantages of conventional extinguishing products and to develop an improved extinguishing composition having both of environmental protecting and fire extinguishing properties which can replace Halon 1211 as extinguishing materials for using in portable or automatic fire extinguishing systems, and which enhances the extinguishing effect. Common flame retardants can be applied directly on combustible materials to form a barrier film which can insulate the combustible materials against the air so as to prevent such combustible materials from rapid burning due to exposure to heat and delay ignition time in order to achieve the fire-proof effect. The flame retardants used in the present invention include ammonium salts, disodium hydrogen phosphates, sodium borate decahydrate and nitrides. Among which, diammonium hydrogen phosphate, $(NH_4)_2$ $HPO_4$, can be used as the ammonium salts, and dicyandiamide can be used as the nitride. Said materials are available from commercial flame retardants, for example, those produced by BIO-Fax (Germany), or Bio-Pan, (Taiwan, ROC).

In addition, the present fire extinguishing composition contains extinguishing reagents, e.g., [2-(2-butoxyethoy-)ethanol] and water, which are available from commercial extinguishing materials, such as, products of BIO-Fax (Germany), MONSANTO Co. or Bio-Pan (Taiwan, ROC). The fire extinguishing composition of the invention comprises a reagent A which contains 22–32% diammonium hydrogen phosphate, 17–27% disodium hydrogen phosphate, 8–14% dicyandiamide, and 4–8% sodium borate decahydrate, and a reagent B which contains 20–30% 2-(2-butoxyethoxy)ethanol and 8–12% water. The composition is prepared by mixing reagent A with reagent B to form a concentrated reagent C. The concentrated reagent C may then be mixed with water in a ratio of 1:9 to obtain the fire extinguishing composition.

DETAILED DESCRIPTION OF THE PREFERED EMBODIMENT

The process for producing the fire extinguishing compositions according to the present invention comprises hydrolyzing the above-said flame retardants and above-said extinguishing reagents, and then applying these two aqueous solutions alone or as an admixture with appropriate ratio in a portable pressure-type or automatic fire extinguishing systems. In addition, the process according to the invention comprises combining constituents in suitable ratio to form a stable extinguishing concentrate.

The extinguishing compositions according to the invention have a pH value of 7–8, evaporizing rate of<100 (relative to that of ethyl acetate is 1), vapor density of 0.62 (that of air=1) and a clear amber appearance, and exhibits excellent stability. Generally, fire can only occur on the base of simultaneous establishment of three essential elements, e.g., combustible materials, temperature reaching ignition point, and oxygen, and if any one of said three combustion elements is absent or eliminated, no ignition will occur or the existing fire will be extinguished.

Common extinguishing methods consist generally of lowering temperature (such as spraying water or carbon dioxide) or insulating oxygen (such as, spraying chemical agents for insulating oxygen or reacting therewith ) in order to control the firing state and to achieve the object of extinguishiing. However, the incompletely combusted material is easily re-ignited. Furthermore, the effectiveness and dosage of the extinguishing materials should be taken account of, and it is difficult to completely extinguish a fire in a short period of time.

The fire extinguishing compositions can eliminate at the same time all of the three combustion elements so as to achieve the object of rapid extinguishing of the fire. The involved extinguishing approaches include as follows:

1. Elimination of combustible material: converting combustible materials into noncombustible materials—subjects which have been applied with flame retardants and extinguishing reagents according to the invention will generate molecules through cracking when they burn upon heating, which molecules are able to destroy the chain reaction of flame and have a barrier action against oxygen so that the flame can not spread and smoking will be stopped, and that an anti-ignition temperature as high as 1500° C. can be achieved without rekindling. The products according to the invention have passed tests according to the British fireproof regulations B.S. 476, B.S. 5852, and B.S. 5867.

2. Lowering of temperature by cooling: Products of the present invention have passed the HB5875-85 test by Peking Fire-proof Science Institute, the Commodity Examination Agency, the People Republic of China. When the extinguishing composition of the invention has been applied over the firing place through the pressurizing device of the extinguisher, a layer of white foam will be generated surrounding combustible materials to form a protective barrier between fire sources and combustible materials and thereby to insulate oxygen. Meanwhile, water will be released from the bubbles formed by high pressure spraying and spread over the fire to lower rapidly the temperature so that fire can be extinguished quickly and will not be rekindled.

3. Insulating of oxygen: the compositions of the present invention have dual oxygen insulating functions which will be described separately as follows:

(1) The water contained in the compositions of the invention will transform into steam in the high temperature fire place. The water molecules in the steam will diffuse and spread over the fire place having high gas density, which assists in dispersing and insulating of fresh air from re-entering. Meanwhile, hydrolysable constituents contained in the fire proof or extinguishing compositions of the invention will stay on the firing place so as to contribute to the effect of oxygen insulating.

(2) The flame retardant contained in the compositions of the invention can form a water membrane and cohesive polymeric layer such that a cohesive macromolecular polymeric layer is formed between said water membrane and the burning surface of polar solvent, which is of protective value and contributes to extinguishing to prevent vaporization of liquid.

The fire proof or extinguishing and heat insulating functions produced by the compositions of the invention include as follows:

(1) The diammonium hydrogen phosphate and disodium hydrogen phosphate contained in the compositions of the invention will decompose into phosphoric acid and ammonia upon heating.

(2) The phosphoric acid produced as above will form carbonized layer with the material being combusted, which carbonized layer has functions of oxygen insulating and temperature lowering, and meanwhile, will produce nontoxic gases which do not assist firing.

(3) At the instant of fire extinguishing, water contained in the compositions of the invention will vaporize into large amount of steam which insulates fresh air from entering the firing place and prevents rekindling.

(4) The compositions of the invention are able to form a layer of white foam surrounding the combustible material and between the fire source and the combustible material so as to insulate oxygen, and at the same time, water will be released from bubbles formed through high pressure spraying to extinguish the fire, such that, temperature can be lowered rapidly and fire be extinguished quickly without rekindling.

In order to further understand the features and technical context of the present invention, the following detailed description of the invention with reference to examples thereof is provided:

EXAMPLE 1

| | |
|---|---|
| Reagent A: | |
| Diammonium hydrogen phosphate | 27% |
| Disodium hydrogen phosphate | 22% |
| Dicyandiamide | 11% |
| Sodium borate decahydrate | 6% |
| Reagent B: | |
| 2-(2-butoxyethoxy)ethanol | 24% |
| Water | 10% |

Experimental procedure:

(1) Combining diammonium hydrogen phosphate (27%), disodium hydrogen phosphate (22% ), dicyandiamide (11% ) and sodium borate decahydrate (6% ) to form reagent A;

(2) Combining 2-(2-butoxyethoxy)ethanol (24%) and water (10%) to form reagent B;

(3) Mixing reagent A and B as above to form concentrate C; and (4) Mixing concentrate C with water in a ratio of 1:9 to obtain extinguishing compositions;

alternatively, the extinguishing compositions thus obtained can be pressurized to form a fire proof or extinguishing material.

EXAMPLE 2

| | |
|---|---|
| Reagent A: | |
| Diammonium hydrogen phosphate | 25% |
| Disodium hydrogen phosphate | 24% |
| Dicyandiamide | 12% |
| Sodium borate decahydrate | 5% |
| Reagent B: | |
| 2-(2-Butoxyethoxy)ethanol | 22% |
| Water | 10% |

Experimental procedure:

(1) Combining diammonium hydrogen phosphate (25%), disodium hydrogen phosphate (24% ), dicyandiamide (12) and sodium borate decahyrate (5%) to form reagent A; .

(2) Combining 2-(2-butoxyethoxy)ethanol (22%) and water (10%) to form reagent B;

(3) Mixing reagent A and B above to form concentrate C; and (4) Mixing concentrate C with water in a ratio of 1:9 to obtain a extinguishing compositions;

alternatively, the extinguishing compositions thus obtained can be pressurized to form a fire proof or extinguishing material.

The fire proof or extinguishing compositions according to the invention can be pressurized to form a fire proof or extinguishing material. The enhanced effects thereof with respect to conventional extinguishing material are shown as follows:

| Type of extinguishing material | Loading amount (kg) | Extinguishing efficiency value | Extinguishing area ($m^2$) |
|---|---|---|---|
| The present invention | 2 | B-10 | 22 |
| Halon | 2.2 | B-4 | 8.8 |
| Dry powder | 2 | B-4 | 8.8 |
| Carbon dioxide | 2.3 | — | 2.2 |

The advantages of the invention include are as follows;

1.. Non-toxity: the extinguishing compositions of the invention are clear, colorless, odorless, non-polluting and free of chlorofluorocarbon solvent. It has a pH of 7, a neutral chemical, and its degradation in ecological environment is not required. Its effectiveness is equivalent to that of mild chemical fertilizer salt, which does not have polluting and corrossive properties, and which does not have any adverse effect on goods, decorations, human and environments (does not destroy the ozone layer). (Have passed tests by Canada Environmental Protection Administration, and the Commodity Examination Agency and Industrial Technology Research Institute commisioned by the Environmental Protection Administration of the Republic of China).

2. Do not burn invisibly and do not rekindle.

3. During the fire extinguishing in situ, fire can be quickly extinguished and at the same instant, the firing place and the toxic dense smoke which is the invisible killer in the fire can be over-spreaded.

4. When leached into the soil, the compositions of the invention can convert into fertilizer and hence does not cause secondary public damage.

5. The compositions of the invention has unique inhibiting effectiveness against volatile gases generated by combustible chemicals of type A and B as well as by accidentally spilled combustible chemicals.

Accordingly, the compositions of the invention can be used as the fire-proof/extinguishing material which has the best insulating property, is nontoxic, does not pollute, has an anti-ignition temperature higher than 1500° C., and has preservative, anti-fungal, and quenching functions. All of the constituents of the compositions of the invention can easily be degraded by the ecological environment. Therefore, the extinguishing compositions of the invention are obviously superior than other types of extinguishing materials, such as, dry powder, foams, carbon dioxide, Halon and the like, since they do not produce dust or gases harmful to the environment, and can completely extinguish fire without rekindling, as well as being loadable into various types of extinguishers, and extinguishing cylinders so that, after pressure spraying, an excellent effect of both extinguishing and rekindle-preventing can be achieved.

Accordingly, the fire proof or extinguishing compositions of the invention are novel, and can improve various functions as described above, hence, it meets novelty, industrial utility and advancement requirements for legal invention patent.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A concentrated fire extinguishing composition which comprises:

a reagent A which contains diammonium hydrogen phosphate, disodium hydrogen phosphate, dicyandiamide, and sodium borate decahydrate as components; and a reagent B which contains 2-(2-butoxyethoxy)ethanol and water as components.

2. A concentrated fire extinguishing composition as claimed in claim 1 comprising:

| | |
|---|---|
| diammonium hydrogen phosphate | 22–32%; |
| disodium hydrogen phosphate | 17–27%; |
| dicyandiamide | 8–14%; |
| sodium borate decahydrate | 4–8%; |
| 2-(2-butoxyethoxy)ethanol | 20–30%; and |
| water | 8–12%. |

3. A concentrated fire extinguishing composition as claimed in claim 1 comprising:

| | |
|---|---|
| diammonium hydrogen phosphate | 27%; |
| disodium hydrogen phosphate | 22%; |
| dicyandiamide | 11%; |
| sodium borate decahydrate | 6%; |
| 2-(2-butoxyethyoxy)ethanol | 24%; and |
| water | 10%. |

4. A fire extinguishing composition which comprises the concentrated composition as claimed in claim 1 mixed with additional water in a ratio of 1 part concentrate to 9 parts water.

5. A fire extinguishing composition which comprises the concentrated composition as claimed in claim 2 mixed with additional water in a ratio of 1 part concentrate to 9 parts water.

6. A fire extinguishing cgmposition which comprises the concentrated composition as claimed in claim 3 mixed with additional water in a ratio of 1 part concentrate to 9 parts water.

7. A process for preparing a fire extinguishing composition, said process comprising the steps of:

mixing diammonium hydrogen phosphate, disodium hydrogen phosphate, sodium borate decahydrate and dicyandiamide to form a reagent A;

mixing 2-(2-butoxyethoxy)ethanol with water to form a reagent B;

mixing reagent A with reagent B to form a concentrated reagent C; and mixing the concentrated reagent C with water in a ratio of 1:9.

* * * * *